United States Patent [19]

Midgley

[11] Patent Number: 4,799,354
[45] Date of Patent: Jan. 24, 1989

[54] TURBOPROPELLER OR TURBOFAN GAS TURBINE ENGINE

[75] Inventor: Ronald A. Midgley, Derby, England

[73] Assignee: ROLLS-ROYCE plc, London, England

[21] Appl. No.: 133,484

[22] Filed: Dec. 15, 1987

[30] Foreign Application Priority Data

Jan. 15, 1987 [GB] United Kingdom ............... 8700806

[51] Int. Cl.[4] ............................................. F02C 7/268
[52] U.S. Cl. ................................. 60/39.142; 60/226.1; 74/768; 416/32
[58] Field of Search ............... 60/39.142, 39.2, 226.1; 74/7 E, 15.69, 15.88, 768, 785, DIG. 5; 416/31, 32 R

[56] References Cited

U.S. PATENT DOCUMENTS

| | | | |
|---|---|---|---|
| 2,529,973 | 11/1950 | Sedille et al. | 60/39.142 |
| 2,583,872 | 1/1952 | Newcomb | 74/DIG. 5 |
| 2,838,913 | 6/1958 | Peterson et al. | 60/39.142 |
| 2,852,912 | 9/1958 | Kelley | 74/DIG. 5 |
| 3,093,010 | 6/1963 | Spreitzer et al. | 60/39.2 |
| 4,251,987 | 2/1981 | Adamson | 60/226.1 |

FOREIGN PATENT DOCUMENTS

| | | |
|---|---|---|
| 0087302 | 2/1983 | European Pat. Off. |
| 736032 | 8/1955 | United Kingdom |
| 755925 | 8/1956 | United Kingdom |
| 765021 | 1/1957 | United Kingdom |
| 832656 | 4/1960 | United Kingdom |
| 1075846 | 7/1967 | United Kingdom |

*Primary Examiner*—Louis J. Casaregola
*Attorney, Agent, or Firm*—Cushman, Darby & Cushman

[57] ABSTRACT

A turbopropeller, or turbofan, gas turbine engine comprising a single spool core engine arranged to drive a propeller, or a fan, via gear means may be provided with a starter motor, and a clutch means.

The clutch means disengages the propeller, or fan, from the gear means and core engine when the core engine is at rest or running below a predetermined speed to allow easy starting of the core engine by the starter motor. The clutch means engages the propeller, or fan, with the gear means and core engine when the core engine is running at or above the predetermined speed.

An axially moveable piston may be provided to brake the propeller when the clutch means has disengaged the propeller from the core engine.

11 Claims, 3 Drawing Sheets

TURBOPROPELLER OR TURBOFAN GAS TURBINE ENGINE

The present invention relates to turbopropeller, or turbofan, gas turbine engines and is particularly concerned with starter mechanisms.

Turbopropeller, or turbofan, gas turbine engines comprise a core engine which produces the power to drive a propeller, or a fan. The propeller, or fan may be driven by the core engine either directly via shaft means, or via shaft means and gear means.

The present invention is concerned with turbopropeller, or turbofan, gas turbine engines in which the core engine drives the propeller, or fan via shaft means and gear means, and in which the core engine is a single spool or rotor core engine.

In starting a gas turbine engine the starter mechanism must produce igh torque to the gas turbine engine rotating assembly in a manner that provides smooth acceleration from rest up to a speed at which the gas flow through the gas turbine engine provides sufficient power for the gas turbine engine to be self supporting.

It is well known in the prior art to use air motors, electric motors etc which are arranged to drive the high pressure rotor or spool of the gas turbine engine via a reduction gear and an auxilliary drive up to the self sustaining speed when a clutch mechanism disconnects the starter motor.

The use of these starter motors on a single spool or rotor core engine turbopropeller, or turbofan, requires the whole of the core engine together with the propeller, or fan, to be motored up to the self sustaining speed.

The present invention seeks to provide a turbopropeller, or turbofan gas turbine engine which has a single spool core engine which can be started relatively easily.

Accordingly the present invention provides a turbopropeller, or turbofan, gas turbine engine comprising a core engine having in flow series a compressor means, combustor means, and a turbine means, the turbine means and compressor means being coaxial and the turbine means being arranged to drive the compressor means, a propeller, or a fan, being arranged to be driven by the turbine means via shaft means and gear means, a starter means being arranged to drive the shaft means in order to start the core engine, clutch means being arranged to allow the turbine means to drive the propeller, or fan, via the gear means when the core engine is running at or above a predetermined speed, and to prevent the turbine means driving the propeller, or fan, via the gear means when the core engine is running below the predetermined speed or is at rest, to allow easy starting of the core engine by the starter means.

The gear means may comprise a first reduction gear assembly and a second reduction gear assembly, the first reduction gear assembly comprising a first sun gear provided on and driven by the shaft means, a plurality of first planet gears meshing with the first sun gear, and a first annulus gear surrounding and in mesh with the first planet gears, the first planet gears being rotatably mounted on a first carrier means, the second reduction gear assembly comprising a second sun gear provided on second shaft means driven by the first carrier means, a plurality of second planet gears meshing with the second sun gear, and a second annulus gear surrounding and in mesh with the second planet gears, the second planet gears being rotatably mounted on a second carrier means, the second carrier means being driveably connected to the propeller, or fan, the clutch means being arranged to disengageably connect the first and second annulus gears.

Brake means may be provided to prevent the propeller, or fan, rotating when the core engine is running below the predetermined speed or is at rest.

The brake means may comprise a brake member having a first frusto conical surface adapted to be moved axially into cooperation with a second frusto conical surface on the first carrier means by biasing means to prevent rotation of the first carrier means when the core engine is running below the predetermined speed or is at rest.

Hydraulic fluid may be supplied to a chamber formed in part by the brake member, the pressure of the fluid in the chamber acts on the brake member to move the brake member axially against biasing means to allow rotation of the first carrier means when the core engine is running at or above the predetermined speed.

The brake member may comprise an annular piston and the biasing means may comprise a plurality of belleville washers.

The clutch means may extend circumferentially and surrounds the first annulus gear, the inner surface of the clutch means may have a friction liner, the clutch means is drivingly coupled to the second annulus gear, the clutch means is adapted to move between a first position in which the friction liner of the clutch means grips the first annulus gear so that the clutch means is driven by the first annulus gear when the core engine is running at or above the predetermined speed and a second position in which the friction liner of the clutch means is removed from gripping the first annulus gear when the core engine is running below the predetermined speed.

The clutch means may be adapted to move into the first position by biasing means, and the clutch means may be adapted to move into the second position by operation of an electrical solenoid which moves the clutch means against the biasing means.

The starter means may comprise a rare earth starter generator, positioned coaxially with the shaft means.

The propeller, or fan, may be positioned upstream of the core engine, the gear means, clutch means and starter means are positioned axially between the propeller, or fan, and the core engine.

The core engine may comprise a centrifugal compressor and a radial turbine.

The present invention will be more fully described by way of example with reference to the accompanying drawings in which.

Figure 1:
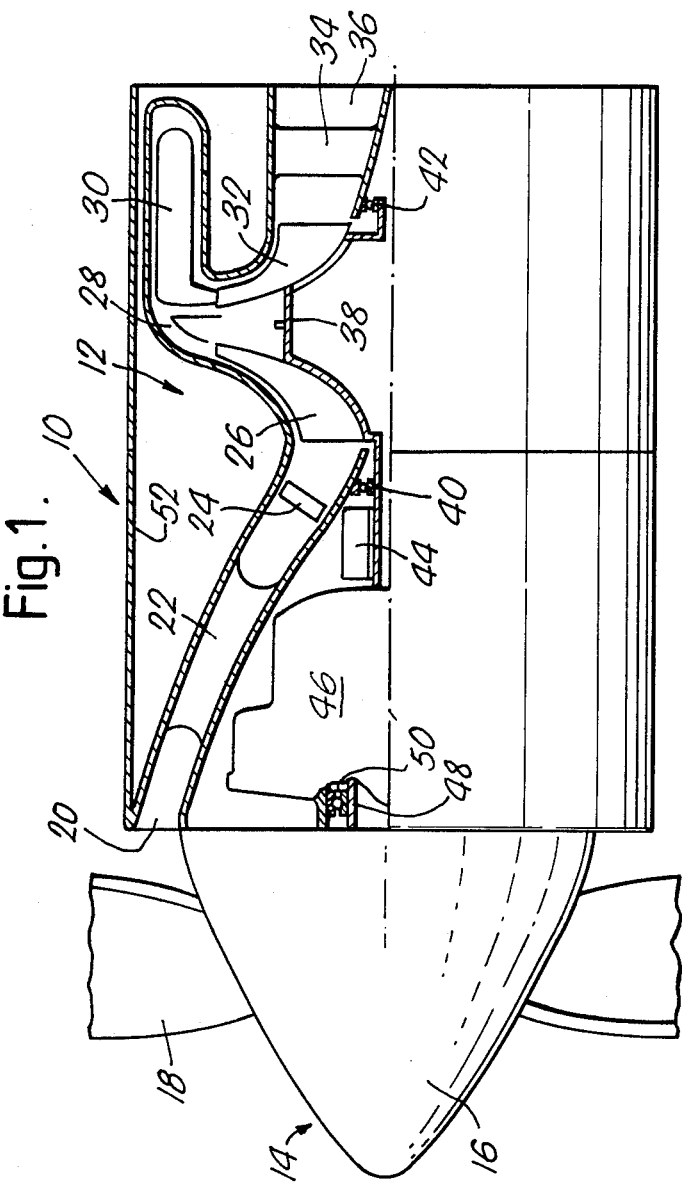
FIG. 1 shows a partially cut away view of a turbopropeller gas turbine engine having gear means and a starter mechanism according to the present invention.

A turbopropeller gas turbine engine 10 is shown in FIG. 1 and comprises a core engine 12 and a propeller 14.

The propeller comprises a spinner 16 and a plurality of propeller blades 18.

The core engine comprises an annular inlet 20, fixed vanes 22 and variable guide vanes 24 through which air flows to a centrifugal compressor 26. The centrifugal compressor 26 supplies compressed air to combustor means 30 through a diffuser 28. Fuel is burnt in the combustor means 30 to produce hot gases which flow through a radial flow turbine 32, a set of vanes 34 and an exhaust 36.

The radial turbine 32 is arranged to drive the centrifugal compressor 26 via a shaft 38, and the shaft 38 is rotatably mounted, by upstream and downstream bearings 40 and 42 respectively, on the core engine casing 52.

The radial turbine 32 is also arranged to drive the propeller 14 via the shaft 38, gear means 46 and a shaft 48, the shaft 48 is rotatably mounted, by a bearing 50, on the gear means 46.

Figure 2:
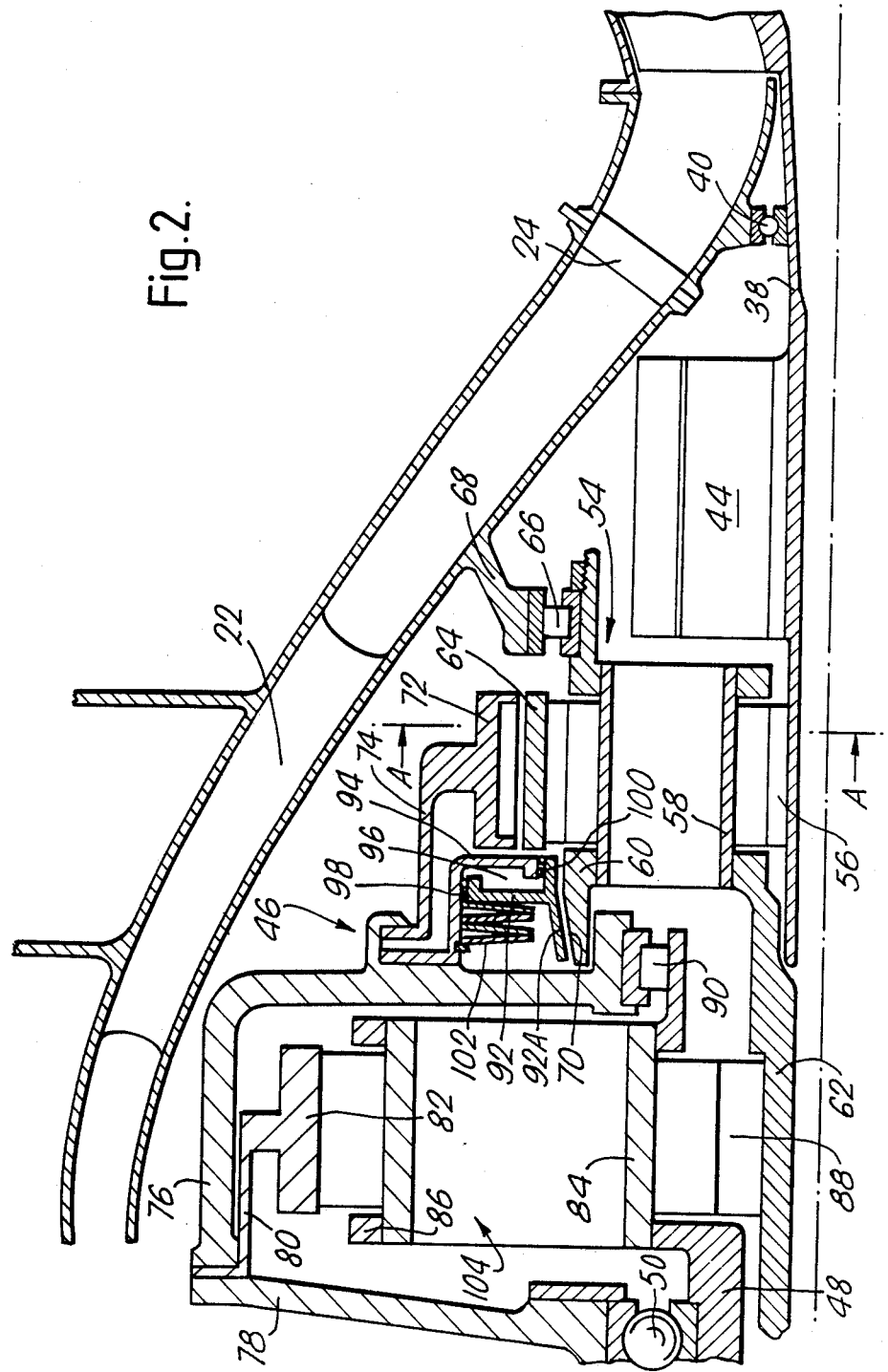
FIG. 2 shows an enlarged longitudinal sectional view of the gear means and starter mechanism.

The gear means 46 is shown more clearly in FIG. 2 and comprises a first reduction gear assembly 54 and a second reduction gear assembly 104. The first reduction gear assembly 54 comprises a first sun gear 56 which is driven by shaft 38 and which meshes with a plurality of first planet gears 58, and the first planet gears 58 also mesh with an annulus gear 64. The first planet gears 58 are rotatably mounted on a first carrier 60 which is secured to, or is integral with, a shaft 62, and the first carrier 60 is rotatably mounted on structure 68 which is part of the core engine 12 by a bearing 66.

The second reduction gear assembly 104 comprises a second sun gear 88 which is driven by shaft 62 and which meshes with a plurality of second planet gears 84, and the second planet gears 84 also mesh with a second annulus gear 82. The second planet gears 84 are rotatably mounted on a second carrier 86 which is secured to, or is integral with, the shaft 48.

A housing is formed from housing parts 78 and 76, and the second annulus gear 82 is drivingly coupled to the housing by a coupling 80. The second carrier 86 is rotatably mounted on housing part 76 by a bearing 90, and the shaft 48 is rotatably mounted on housing part 78 by the bearing 50.

Figure 3:
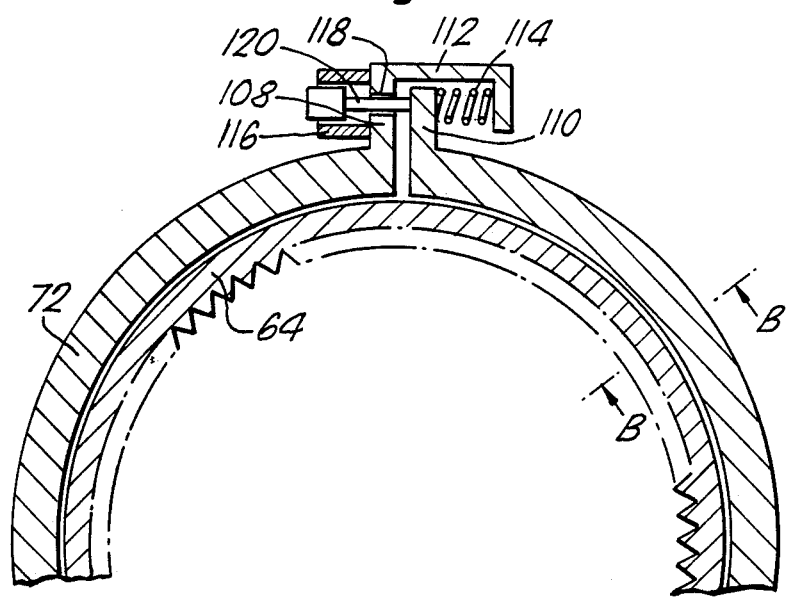
FIG. 3 is a section along A—A of FIG. 2.
Figure 4:
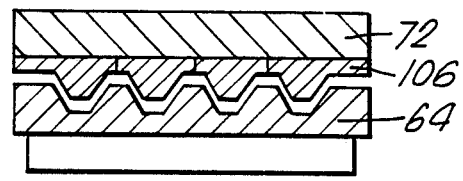
FIG. 4 is an enlarged section along B—B of FIG. 3.

A clutch means 72 is positioned coaxially with and surrounds the first annulus gear 64, and the clutch means 72 is drivingly coupled to the housing part 76 by a coupling 74. The clutch member 72 as shown in FIGS. 3 and 4 has an inner surface which forms a friction liner 106, and the clutch member 72 extends circumferentially and is split and has two confronting flanges 108 and 110. A spring 114 is positioned between an L-shaped member 112, which extends from the flange 108, and the flange 110 to bias the flanges 108 and 110 together so that the friction liner 106 grips the outer surface of the annulus gear 64. An electrical solenoid 116 is arranged on the flange 108 on the opposite side to the flange 110, and an aperture 118 is formed in the flange 108 coaxial with the solenoid 116. A metal bar or rod 120 extends from the flange 110 through aperture 118 into the solenoid 116.

The liner 106 is preferably a material with a high friction coefficient, and the liner 106 may be grooved, as shown in FIG. 4, to increase its effectiveness, likewise the corresponding outer surface of the annulus gear 64 will be grooved.

An annular piston 92 is positioned coaxially around the first carrier 60, and forms an annular chamber 96 with an annular member 94 which is secured coaxially to the housing part 76. Ring seals 98 and 100 are positioned between the annular piston 92 and annular member 94 to seal the chamber 96. A plurality of e.g. belleville washers 102, or other biasing means, are provided to bias the piston 92 axially, so that a frusto conical surface 92A of the piston 92 abuts a corresponding frusto conical surface 70 of the first carrier 60 to brake the first carrier. The chamber 96 is arranged to be supplied with hydraulic fluid, i.e. oil, from the core engine, to urge the piston 92 against the biasing of the bellville washers 102 to remove the braking effect from the first carrier.

A starter motor/alternator 44, e.g. a samarium cobalt or other rare earth metal starter/alternator, is provided coaxially around the shaft 38 and is arranged to drive the shaft 38 in order to start the core engine of the gas turbine engine, and is also arranged to provide power for engine accessories i.e. fuel and oil pumps and all engine controls when the engine has been started.

When the gas turbine engine is at rest there is no power for the supply of hydraulic fluid to annular chamber 96, and therefore the piston 92 is biased by the belleville washers 102 so that the frusto conical surface 92A of the piston 92 abuts the corresponding frusto conical surface 70 of the first carrier 60, and brakes the first carrier. This prevents free rotation of the first carrier 60 and shaft 62 and hence the second reduction gear assembly 104 and propeller 14 when the gas turbine engine is at rest.

The clutch means 72 is disengaged from the outer surface of the first annulus gear 64 during the starting sequence and idle, by operation of the solenoid 116 which causes the rod 120 and flange 110 to move against the spring 114, to release the liner 106 from gripping the annulus gear 64.

When the starter motor is activated to start the core engine by operation of solenoid 116, the starter motor drives only the core engine, because the clutch means 72 is disengaged, i.e. the sun gear 56 drives the first planet gears 58, but the first planet gears 58 drive only the first annulus gear 64 because the first carrier 60 is locked because of the braking effect, and no drive is transmitted to the gear housing and second reduction gear because the clutch is not engaged. This enables very easy starting of the engine, and enables passengers and crew members to be in the immediate vicinity of an aircraft and engine during starting of the engine without any danger from rotating propellers.

When the core engine has reached self sustaining speed the starter generator is switched from starter mode and may be switched to generator mode.

Once the core engine of the turbopropeller gas turbine engine is running at or above a predetermined speed, the solenoid 116 is released and the spring 114 causes the liner 106 to grip the annulus gear 64 and the clutch means 72 is driven by the outer surface of the first annulus gear 64, and the pressure of hydraulic fluid supplied to chamber 96 is sufficient to overcome the biasing effect of the belleville washers 102 and move the piston 92 axially away from the first carrier 60 to remove the braking effect.

The first sun gear 56 now drives the first planet gears 58 which in turn react against the first annulus gear 64 and drive the first carrier 60.

The second sun gear 88 is now driven by the shaft 62 and first carrier 60 in the same direction as the first sun gear 56, and the second planet gears 84 drive the second carrier 86, shaft 48 and propeller 14.

Although the description has been in respect of a turbopropeller gas turbine engine, the invention is also applicable to a single spool turbofan gas turbine engine which has a fan driven by gear means from the core engine.

The predetermined speed will be a suitable speed greater than ground idle, and the belleville washers will be chosen to be overcome by the pressure of the hydraulic fluid when the core engine is running at the predetermined speed.

It would be possible to use other arrangements of clutch or brake, for example the clutch arrangement described could be used as a brake, and the brake arrangement could be used as a clutch.

I claim:

1. A gas turbine engine comprising a core engine having in flow series a compressor means, combustor means and turbine means, the turbine means and compressor means being coaxial and the turbine means being arranged to drive the compressor means, a rotor having a plurality of blades, the rotor being arranged coaxial with the turbine means, shaft means and gear means, the turbine means being arranged to drive the compressor means via the shaft means, the turbine means being arranged to drive the rotor via the shaft means and the gear means, the gear means comprising a first reduction gear assembly and a second reduction gear assembly, the first reduction gear assembly comprising a first sun gear, a plurality of first planet gears, a first carrier means and a first annulus gear, the first sun gear being provided on and being driven by the shaft means, the plurality of first planet gears meshing with the first sun gear, the first annulus gear surrounding and meshing with the first planet gears, the first planet gears being rotatably mounted on the first carrier means, the second reduction gear assembly comprising a second sun gear, a plurality of second planet gears, a second carrier means and a second annulus gear, the second sun gear being provided on and being driven by the first carrier means, the plurality of second planet gears meshing with the second sun gear, the second annulus gear surrounding and meshing with the second planet gears, the second planet gears being rotatably mounted on the second carrier means, the second carrier means being drivingly connected to the rotor, a starter means being arranged to drive the shaft means in order to start the core engine, a clutch means being arranged to disengageably connect the first and second annulus gears, the clutch means being arranged to allow the turbine means to drive the rotor via the gear means when the core engine is running at or above a predetermined speed, and to prevent the turbine means driving the rotor via the gear means when the core engine is running below the predetermined speed or is at rest to allow easy starting of the core engine by the starter means.

2. A gas turbine engine as claimed in claim 1 comprising brake means, the brake means being provided to prevent the rotor rotating when the core engine is running below the predetermined speed or is at rest.

3. A gas turbine engine as claimed in claim 2 in which the brake means comprises biasing means, a brake member having a first frustoconical surface, the first carrier means having a second frustoconical surface, the brake member being arranged to be moved axially into cooperation with the second frustoconical surface of the first carrier means by the biasing means to prevent rotation of the first carrier means when the core engine is running below the predetermined speed or is at rest.

4. A gas turbine engine as claimed in claim 3 in which the brake member forms at least partially a chamber, the chamber being arranged to be supplied with hydraulic fluid, the pressure of the hydraulic fluid in the chamber acting on the brake member to move the brake member axially against the biasing means to allow rotation of the first carrier means when the core engine is running at or above the predetermined speed.

5. A gas turbine engine as claimed in claim 3 in which the brake member comprises an annular piston, and the biasing means comprises a plurality of belleville washers.

6. A gas turbine engine as claimed in claim 1 in which the clutch means extends circumferentially and surrounds the first annulus gear, the clutch means having an inner surface, the inner surface of the clutch means having a friction liner, the clutch means being drivingly coupled to the second annulus gear, the clutch means being arranged to move between a first position in which the friction liner of the clutch means grips the first annulus gear so that the clutch means is driven by the first annulus gear when the core engine is running at or above the predetermined speed and a second position in which the friction liner of the clutch means is removed from gripping the first annulus gear when the core engine is running below the predetermined speed.

7. A gas turbine engine as claimed in claim 6 in which the clutch means is arranged to move into the first position by biasing means, and the clutch means is arranged to move into the second position by operation of an electrical solenoid which moves the clutch means against the biasing means.

8. A gas turbine engine as claimed in claim 1 in which the starter means comprises a rare earth starter/generator, the rare earth starter/generator is positioned coaxially with the shaft means.

9. A gas turbine engine as claimed in claim 1 in which the rotor is positioned upstream of the core engine, the gear means, clutch means and starter means being positioned axially between the rotor and the core engine.

10. A gas turbine engine as claimed in claim 1 in which the core engine comprises a centrifugal compressor and a radial turbine.

11. A gas turbine engine as claimed in claim 1 in which the gas turbine engine is a turbopropeller, the rotor is a propeller rotor and the blades are propeller blades.

* * * * *